UNITED STATES PATENT OFFICE.

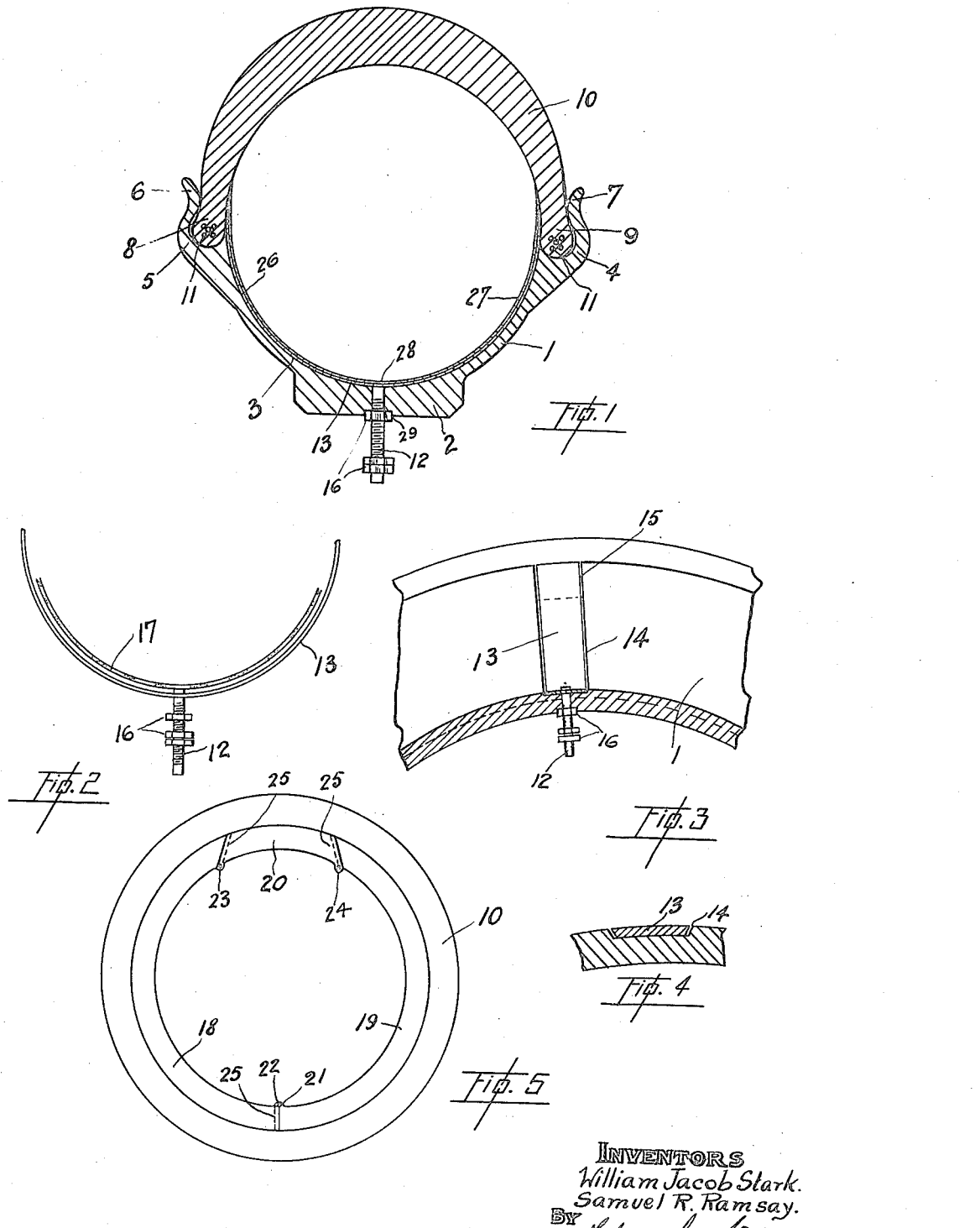

WILLIAM JACOB STARK, OF VANCOUVER, AND SAMUEL R. RAMSAY, OF NEW WESTMINSTER, BRITISH COLUMBIA, CANADA.

RIM FOR PNEUMATIC TIRES.

1,302,447.	Specification of Letters Patent.	Patented Apr. 29, 1919.

Application filed June 11, 1918. Serial No. 239,461.

*To all whom it may concern:*

Be it known that we, WILLIAM JACOB STARK and SAMUEL R. RAMSAY, respectively a subject of the King of Great Britain and a citizen of the United States, and residents, respectively, of the cities of Vancouver and New Westminster, in the Province of British Columbia, Canada, have invented certain new and useful Improvements in Rims for Pneumatic Tires, of which the following is a specification.

Our invention relates to improvements in rims for pneumatic tires, and the object of the invention is to provide a rim to receive a tire in which the area of the outer casing and the amount of rubber and cotton employed in its construction is greatly reduced without diminishing in any degree the resiliency of the tire, while at the same time enabling the sides of the tire to be formed of non-puncturable material, thereby lengthening the life of the tire to a great extent, since damage due to punctures, cuts and blow-outs is practically eliminated. A further object is to devise a rim of this nature in which the construction is such that the outer casing may be readily put in place or removed and in which provision is made to prevent "creeping" of the same when running.

We attain these objects by the construction illustrated in the accompanying drawings in which—

Figure 1 is a transverse sectional elevation of a tire embodying our improvement.

Fig. 2 is a detail view of the inner curved plate.

Fig. 3 is a fragmentary sectional elevation of the rim showing the inner curved plate in place.

Fig. 4 is a cross section of the inner curved plate.

Fig. 5 is a side elevation of the tire rim.

Similar figures of reference indicate similar parts throughout the several views.

The rim 1 is formed as a hoop provided with a felly-seating portion 2 and having on its outer side a wide deep circumferential channel 3, the edges of which are formed as smaller circumferential channels 4 and 5, the outer edges 6 and 7 of which latter channels are extended to a higher level than the inner edges, the outer sides of the channels being curved as shown in Fig. 1, and adapted to bear on the beads 8 and 9 of an outer casing 10 which fit into these channels and which casing may be formed of the usual or any preferred material and has its beads invested with wires 11 bent to hoop form and extending circumferentially within the beads.

12 indicates the air inlet tube, of any preferred type, to which is secured a curved plate 13 having beveled edges, as shown in Fig. 4, adapted to be placed in a groove 14 of equal depth to the plate thickness having its walls beveled correspondingly to the bevel of the plate edges, the plate extending transversely of the rim so that its ends will be pressed into gaps 15 cut in the inner edges of the circumferential channels 4 and 5 and bear tightly on the beads 8 and 9 when the tire is assembled and the nuts 16 of the inlet valve tube tightened up in place so that creeping of the casing will be thereby prevented. one of these nuts being seated in a recess 29 formed in the rim, as shown in Fig. 1. It will be understood, of course, that the tube 12 extends through the rim, and is connected to the inner inflatable tube 17, in the usual well-known manner, and that the hole in the rim through which the tube 12 extends should be flattened on two opposite sides to correspond to the flats formed on the sides of the tube, according to the present practice. The casing 10 is further provided with flaps 26 and 27 secured to its inner wall, the points of connection of the flaps and the casing being opposite and above the gaps 15 so that the flaps will cover the inner edges of the channels 4 and 5, and these flaps are extended to lie in the channel 3, their free ends being overlapped, as indicated by the numeral 28 in Fig. 1, and thus chafing of inner inflatable tube is prevented.

In order to enable the casing to be readily assembled or dis-assembled, the rim 1 is formed in three portions 18, 19 and 20 hingedly connected together, as shown in 4, so that it may be readily collapsible to permit the placing thereon or removal therefrom of the casing. The two larger segments 18 and 19 are hinged at 21 on a suitable permanently secured pin 22, and the small segment 20 is hinged at one end to the segment 18 by a permanently secured pin 23, its opposite end being detachably connected to the segment 19 by a removable pin 24 and in order to prevent dust and dirt entering at the joints in the rim each segment overlaps the other slightly at the hinge, as indicated by the dotted lines in Fig. 4 and by numeral 25. It will be seen that by removing the pin 24 the rim may be collapsed to permit the mounting or demounting of the inner tube and outer casing.

From the foregoing the utility and advantages of the tire will be apparent without any further extended description as it will be readily seen that on account of the outer casing being much less in area than the casings in present use the original cost is thereby reduced, the resiliency and efficiency of the tire being, however, preserved, and further, that the life of the casing is greatly extended on account of the provision of the anti-creeping plate 13 and the metallic sides of the channel 3.

What we claim as our invention is:

1. A rim comprising a metallic ring having a deep peripheral circumferential channel the opposite margins of which are formed as smaller circumferential channels adapted to inclose the beads of an outer casing mounted on the rim, said smaller channels having gaps formed in their inner walls at opposite points and the wide channel having a transverse groove extending between the gaps, a curved plate adapted to lie in said groove so that its ends extend into said gaps to bear on the said beads, and means for securing said plate in place.

2. A rim comprising a metallic ring having a deep peripheral circumferential channel the opposite margins of which are formed as smaller circumferential channels each having a gap formed in its inner wall, the large channel having a groove extending between said gaps, an outer casing mounted on said rim and provided with beads adapted to lie in the said smaller channels, a curved plate fitting said groove and extending at its opposite ends into said gaps to bear on said beads and having a valved tubular member extending through the rim and adapted for detachable connection therewith, and flaps secured to the inner wall of said outer casing covering the said plate and adapted to overlap along the center of the deep peripheral channel.

Dated at Vancouver, B. C., this 23rd day of May, 1918.

WILLIAM JACOB STARK.
SAMUEL R. RAMSAY.